(12) United States Patent
Rengaraju et al.

(10) Patent No.: US 7,885,266 B2
(45) Date of Patent: Feb. 8, 2011

(54) METHOD FOR IP MULTIMEDIA SERVICES SESSION SETUP

(75) Inventors: Ganesan Rengaraju, Oak Park, IL (US); Lawrence A. Willis, McHenry, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1360 days.

(21) Appl. No.: 11/256,805

(22) Filed: Oct. 24, 2005

(65) Prior Publication Data

US 2007/0091898 A1 Apr. 26, 2007

(51) Int. Cl.
*H04L 12/28* (2006.01)
*H04L 12/56* (2006.01)
(52) U.S. Cl. ................................. 370/395.21
(58) Field of Classification Search ............ 370/389, 370/392, 395.2, 395.21, 395.42
See application file for complete search history.

(56) References Cited

U.S. PATENT DOCUMENTS

| | | | |
|---|---|---|---|
| 7,106,718 B2* | 9/2006 | Oyama et al. ............... | 370/340 |
| 7,460,518 B1* | 12/2008 | Salama et al. ............... | 370/352 |
| 2002/0062379 A1* | 5/2002 | Widegren et al. ........... | 709/227 |
| 2003/0074452 A1* | 4/2003 | Zheng et al. ................ | 709/228 |
| 2004/0085949 A1* | 5/2004 | Partanen et al. ............. | 370/352 |
| 2005/0058125 A1* | 3/2005 | Mutikainen et al. ......... | 370/354 |
| 2006/0075132 A1* | 4/2006 | Liu ............................. | 709/236 |

OTHER PUBLICATIONS

G. Camarillo, Ed., W. Marshall, Ed. And J. Rosenberg, Integration of Resource Management and Session Initiation Protocol (SIP), Oct. 2002, The Internet Society, pp. 9-10, 21.*
M. Garcia-Martin, E. Henrikson and D. Mills, RFC 3455—Private Header (P-Header) Extensions to the Session Initiation Protocol (SIP) for the 3rd-Generation Partnership Project (3GPP), Jan. 2003, The Internet Society, p. 18.*
"Digital Cellular Telecommunications System (Phase 2+); Universal Mobile Telecommunications System (UMTS); Signaling flows for the IP multimedia call control based on Session Initiation Protocol (SIP) and Session Description Protocol (SDP); Stage 3 (3GPP TS 24.228 version 5.13.0 Release 5)", ETSI Standards, European Telecommunications Standards Institute, Sophia-Antipo, FR, vol. 3-CN1, No. V5130, Jun. 2005.

* cited by examiner

*Primary Examiner*—Chirag G Shah
*Assistant Examiner*—Ashley L Shivers

(57) ABSTRACT

A method in a communication of establishing the existence of quality of service preconditions in a communication network, the method comprising the steps of sending (206) an SIP registration request message; and receiving (208) a registration acknowledgement message having a QOS precondition preference indication. Then sending (406) an invite that includes a quality of service precondition message that corresponds with the QoS precondition preference indication of the registration acknowledgement message.

10 Claims, 8 Drawing Sheets

| CASE | A | B | C | D |
|---|---|---|---|---|
| ORIGINATION | Y | Y | N | N |
| TERMINATION | Y | N | Y | N |
| 3GPP 24.229 | REQUIRE: PRECONDITION | WHEN MT RETURNS 420 MO ALTERS SUPPORTED: PRECONDITION | MO - SUPPORTED: PRECONDITION IS OPTIONAL | SAME AS IN CASE C |
| RECOMMENDED CALL FLOWS WITH PARAMETERS | SUPPORTED: PRECONDITION, 100rel. | SUPPORTED: PRECONDITION, 100rel. | NO PRECONDITION | NO PRECONDITION |
| CALL FLOWS | INVITE/183/PRACK | INVITE/200OK. MO SENDS REINVITE ONCE RESERVATION MET | INVITE/200OK. MT SENDS 200 OK ONCE RESERVATION MET | INVITE/200OK. |

EXPLANATION FOR ABBREVIATIONS:
Y - QoS PRECONDITION (RESOURCE RESERVATION MANAGEMENT AND SIP) SUPPORTED
N - QoS PRECONDITION NOT SUPPORTED
MO - MOBILE ORIGINATED
MT - MOBILE TERMINATED
100rel - SUPPORT OF RELIABLE PROVISIONAL RESPONSES
PRACK - SIP PROVISIONAL ACKNOWLEDGE MESSAGE
INVITE - SIP INVITATION

METHOD FOR IP MULTIMEDIA SERVICES SESSION SETUP

FIELD OF THE INVENTION

The present invention relates generally to establishing a data session and in particular to reducing the signaling during a SIP session initiation procedures.

BACKGROUND OF THE INVENTION

Packet data session setup based on Offer and Answer procedures using Session Description Protocol (SDP) is used to exchange multimedia terminal capabilities and agree on a common capability before initiating a session. The Session Initiation Protocol (SIP) describes application level signaling that can carry SDP to setup a session, modify session and terminate session. The use of these protocols to setup a communication session in a packet core network utilizes the resource reservation procedures in order to efficiently make use of the radio resources to transport the media to provide the real time services. One method, defined in the 3GPP IP Multimedia Subsystem (IMS) specifications (23.228 and 24.229) has adopted the use of these IETF standards for hosting multimedia services on SIP packet core networks for mobile environments. Quality of Service (QoS) Precondition is a constraint imposed by the originating mobile to the remote end that requires reservation of resources (e.g. a secondary bearer) at both access networks while setting up the session. Before the terminating mobile alerts to an incoming call, a resource reservation based precondition shall have to be met. An originating mobile may or may not require QoS precondition to the terminating end. The terminating end may or may not support the QoS precondition.

Originating mobiles indicate the requirements for QoS precondition while setting up a SIP session based on service requirements. The originating mobile identifies the ability of the terminating mobile to support the precondition during negotiation. With this solution however, the originating mobile always begins by requiring in the SIP INVITE that the originating network and the terminating mobile support the QoS Precondition. If either does not support the QoS precondition, the originating mobile modifies the SIP INVITE based on current support, either at the originating access network or at the remote mobile, during the SIP negotiation. Modification of the procedure requires additional signaling, additional time and as a result, this diminishes the user experience.

Additionally because the mobile may roam between an IMS core network based on a 3GPP Release 5 network, a 3GPP Release 6 network, WLAN networks or the like, SIP negotiation will differ as WLAN networks do not support resource reservation management while IMS core networks do. Even further, in Release 5 resource reservation is mandatory while in release 6 resource reservation is optional.

The 3GPP IMS specification 24.229 Release 5 mandates the support for "QoS Precondition" on the Gm interface. A mobile initiated or terminated session will fail if the precondition tag is not specified in the SIP INVITE. With this model however, the SIP session initiation without the precondition would not succeed.

A 3GPP Release 6 network requires a UE to perform a detailed criteria based on service based configuration settings to identify whether a specific service would need the QoS precondition before setting up a SIP session. The criterion would be tested (i.e. required at first) at both originating and terminating mobiles during a SIP negotiation phase. This solution however may result in a mismatch between the network support for the QoS precondition and the UE requirement for precondition (either local or remote) and result in poor quality of service and even call failure in some cases. For example, when both UEs are in IMS networks they should be able to support a service with real time QoS. If the static configuration at both UEs indicates precondition not required however, then the UEs will end up in using the interactive primary bearer for media transport also.

Still Further, the UE may require the precondition for a given service, but the originating network may not enforce serve based local policy (SBLP) (Release 6 networks) but the UE shall need to know before following alternative call flows as supported in release 6.

Therefore there is a need to Shorten the SIP session setup time (i.e. reduced call setup time) and minimize number of SIP messages exchanged thereby providing a better user experience while setting up an IMS session.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 is an exemplary table of service support combinations.

Figure 1:
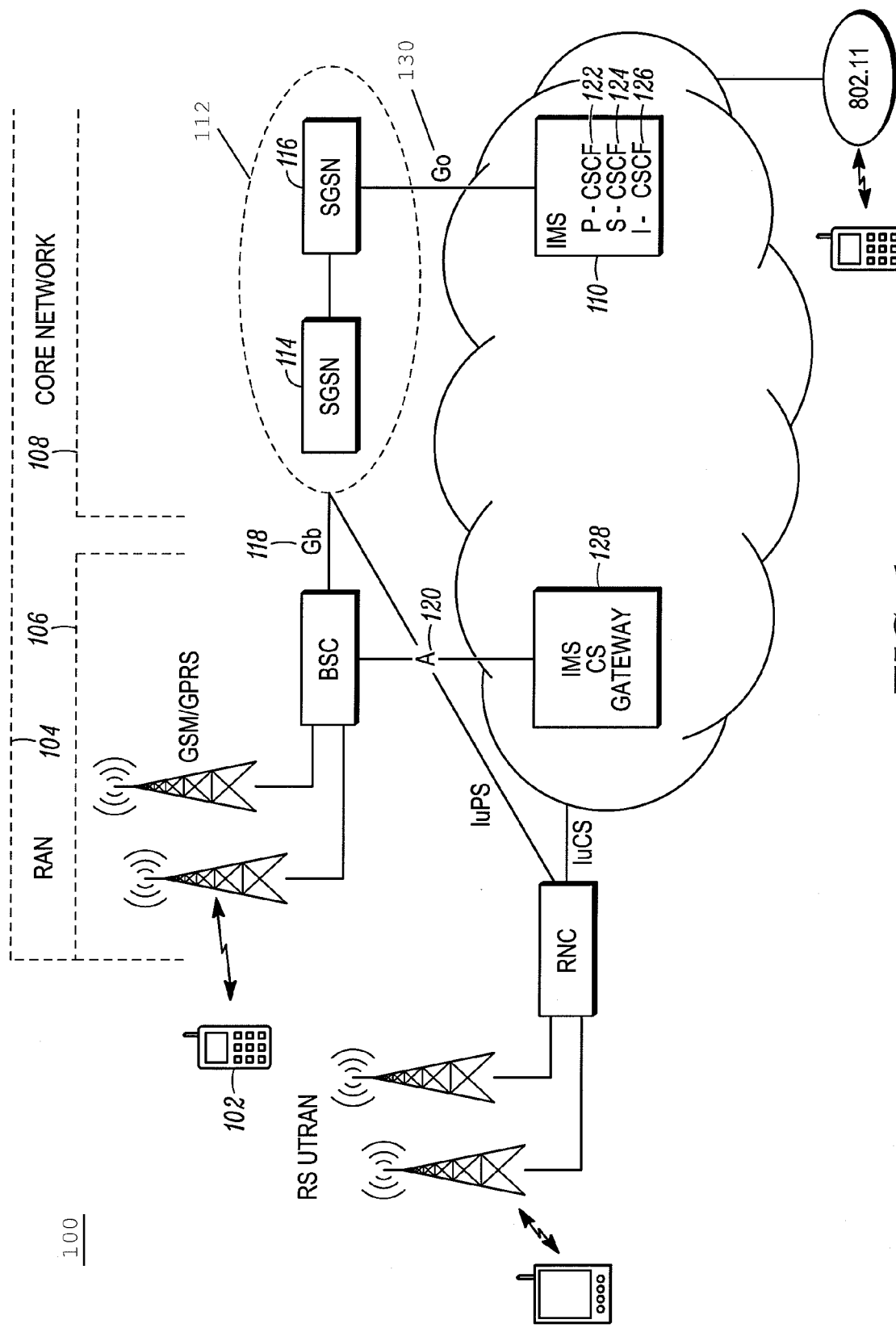
FIG. 1 shows an exemplary wireless communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

While the present invention is achievable by various forms of embodiment, there is shown in the drawings and described hereinafter several examples of embodiments with the understanding that the present disclosure is to be considered an exemplification of the invention and is not intended to limit the invention to the specific embodiments contained herein as will become more fully apparent from the discussion below. It is further understood that the quality of service precondition signaling method and apparatus of the present invention may be used more generally in any application where it is desirable to reduce signaling and call initiation delay.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "a" or "an" may mean more than one.

It will be appreciated that embodiments of the invention described herein may be comprised of one or more conventional processors and unique stored program instructions that control the one or more processors to implement, in conjunction with certain non-processor circuits, some, most, or all of the functions of initiating a packet data session in an IMS network described herein. The non-processor circuits may include, but are not limited to, a radio receiver, a radio transmitter, signal drivers, clock circuits, power source circuits, and user input devices. As such, these functions may be interpreted as steps of a method to perform establishing the IMS network connection.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Before describing in detail exemplary embodiments that are in accordance with the present invention, it should be observed that the embodiments reside primarily in combinations of components related to heat dissipation. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In a communication device, a method of establishing the existence of quality of service preconditions in a communication network is disclosed. The method comprising the steps of sending a session initiation protocol (SIP) registration request message and receiving a registration acknowledgement message having a quality of service (QoS) precondition preference indication therein. Then sending an invite that includes a quality of service precondition message that corresponds with the QoS precondition preference indication of the registration acknowledgement message.

FIG. 1 is an exemplary wireless communication system 100 having at least one remote station or user equipment (UE) 102. Generally it is understood that wireless communication systems have a plurality of remote units coupled to a network through a plurality of base stations however only one is shown here for exemplary purposes. The UE 102 is in wireless communication with the network 104. The network 104 in this embodiment is comprised of a radio access network (RAN) 106 coupled to at least one core network 108. In this exemplary embodiment, the core network 108 includes an internet protocol media subsystem (IMS) 110 network and a GPRS network 112 having a serving GPRS support node (SGSN) 114/gateway GPRS support node (GGSN) 116. It is to be understood though that the core network 108 may be comprised of only one network such as the IMS network 110. In this exemplary embodiment The GPRS network 112 is a 3GPP release 99 network and the IMS 110 network is a 3GPP release 5 network.

In this exemplary embodiment the RAN 106 is coupled to the SGSN 114 by the Gb interface 118 and the RAN 106 is coupled to the IMS network 110 by the A interface 120. The IMS network 110 includes a proxy call/session control function (P-CSCF) 122, a serving call/session control function (S-CSCF) 124 and an interrogating call/session control function (I-CSCF). The GGSN 116 is coupled to the IMS 110 by the Go interface 130. The IMS and the IMS CS gateway provide the internet backbone allowing the information to flow between the UE and the internet. The IMS 110/IMS CS gateway 128 may be accessed by 802.11 access points, SS7, the TDM backbone and the like. The UE may be connected to the IMS 110 through a WLAN such as the 802.11 WLAN illustrated in FIG. 1. In one embodiment, the SGSN 114 and the IMS 110 are also coupled to a UTRAN release 5 RAN 132.

The UE 102 connects to the IMS network using various methods, all of which may use the Internet Protocol (IP). Direct IMS terminals (i.e. mobile phones, PDAs, computers, or the like), can register directly into an IMS network. They may use IPv6 (also IPv4 in 'Early IMS') and SIP User Agents. Fixed access (e.g., DSL, cable modems, Ethernet, or the like), mobile access (W-CDMA, CDMA2000, GSM, GPRS, or the like) and wireless access (WLAN, WiMAX, or the like) may also be supported. Analog phone or non IMS-compatible VoIP systems are supported through gateways.

Upon registration the UE 102 will have a (P-CSCF) associated therewith. This P-CSCF performs resource authorization, and may have additional functions in handling of emergency sessions. The P-CSCF association to the UE may be determined by the CSCF discovery process (i.e. Local CSCF discovery).

In this exemplary embodiment, the UE is a wireless communication device such as a radiotelephone handset. The radiotelephone described herein is a representation of the type of wireless communication device that may benefit from the present invention. However, it is to be understood that the present invention may be applied to any type of multiple housing, hand-held or portable device including, but not limited to, the following devices: radiotelephones, cordless phones, paging devices, personal digital assistants, smartphone, portable computers, pen-based or keyboard-based handheld devices, remote control units, portable media players (such as an MP3 or DVD player) and the like. Accordingly, any reference herein to the user equipment, wireless communication device or radiotelephone should also be considered to apply equally to other hand-held or portable electronic devices.

Figure 2:
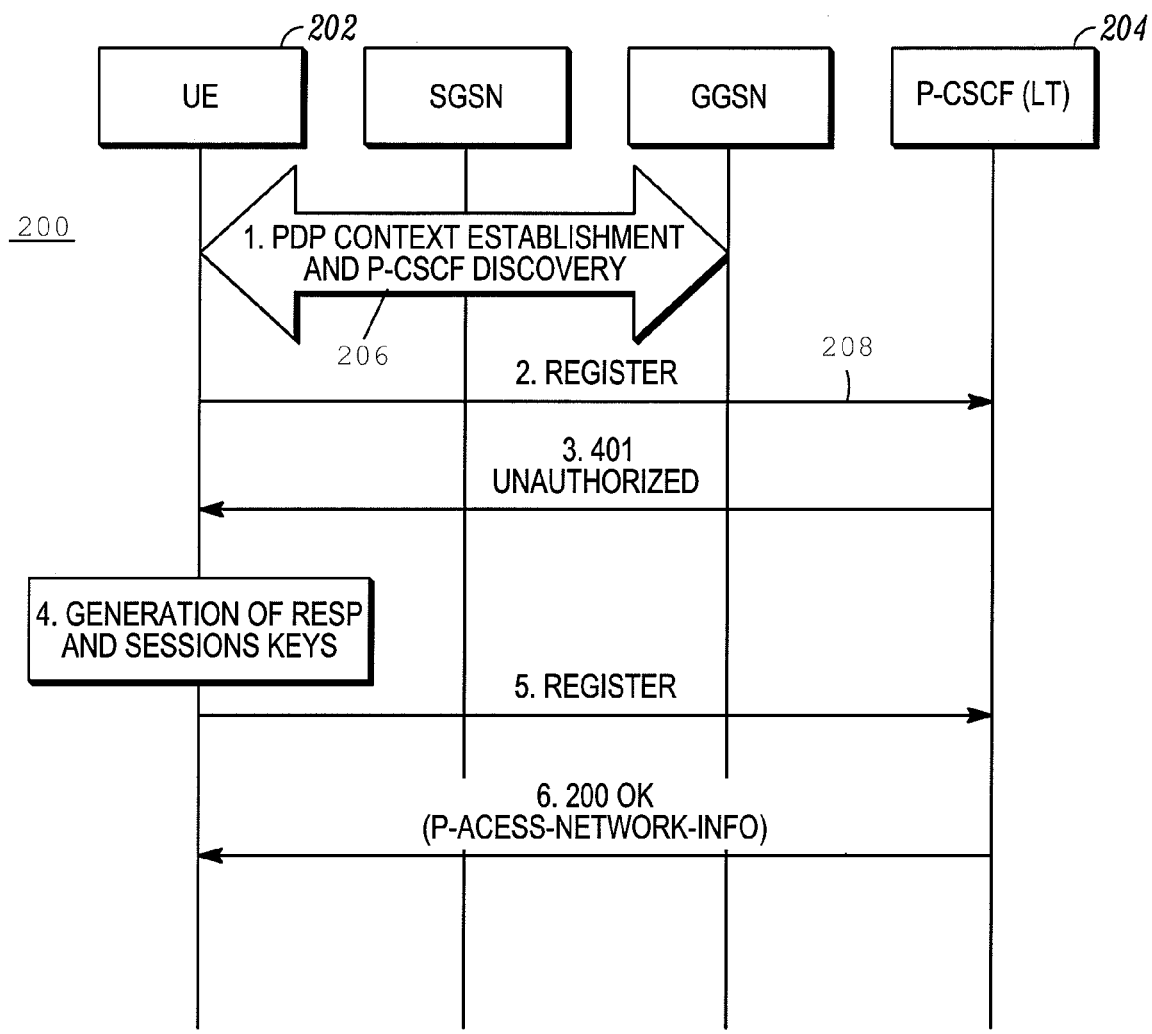
FIG. 2 shows an exemplary communications ladder diagram for registration.

FIG. 2 is an exemplary communications ladder diagram 200 showing the user equipment 302 on the left and the network 304 on the right, illustrating the communication flow between the UE 202 and the network 204. The QoS precondition status is determined beginning with the UE 202 sending a PDP context establishment message and a SIP registration message 208 to the P-CSCF.

In this embodiment the first step is establishing a PDP context and performing the P-CSCF discovery procedures by way of the PDP contex establishment message and a SIP registration message. Next the UE 202 sends 208 a registration message which is a service initiation protocol (SIP) message in this exemplary embodiment. The UE 202, in response to the registration message, receives a "P -Access_network-info" message acknowledging the registration request by the UE 202. The P-Access_network-info message includes a network preference for QoS indicator. The QoS precondition preference indicates that the network supports the QoS precondition and in particular to this exemplary embodiment can provide a secondary bearer. The "P-Access_network-info" message may also include access-net-spec, access-type, access-info, extension-access-info, cgi-3gpp, utran-cell-id-3gpp, and ims-release messages independently or in any combination thereof. The "P-Access_network-info" message is not limited to these messages.

Figure 4:
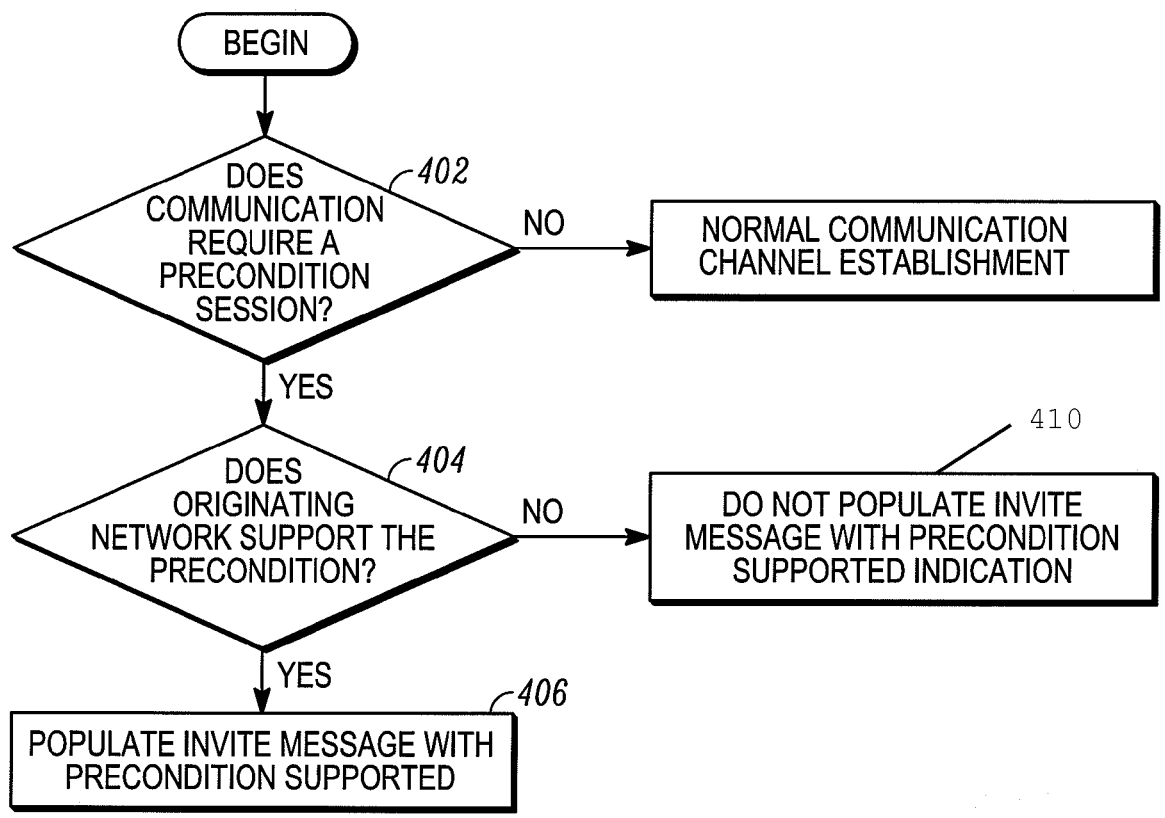
FIG. 4 shows an exemplary flow diagram for a session initiation protocol.

FIG. 3 is a table 300 illustrating the QoS precondition network capability possibilities. The table 300 illustrates which QoS precondition message is to be sent from the originating UE based on the network capability and the information received from the network in response to the SIP registration of the UE 102. In accordance with FIG. 3, FIG. 4 is an exemplary flow diagram illustrating the call flow options in conjunction with table 300. In this exemplary embodiment, the UE 102 will determine at decision 402 if a communication requires a QoS precondition, i.e. real time video, real-time data streaming or the like. When the originating UE is coupled to an originating network that has the capability to provide the QoS precondition, i.e. the secondary bearer, the originating UE will send an INVITE message populated with a "supported: precondition, 100rel" message at step 406. If the network has indicated at registration of the originating UE that the network does not support QoS precondition, then the UE does not populate the INVITE 410 with a precondition message at step 410.

The INVITE message follows a session description protocol (SDP). The session description protocol (SDP) is an internet engineering task force (IETF) protocol that defines a message format for describing a multimedia session. Data such as version number, contact information, broadcast times and audio and video encoding types are included in the message.

In response to the INVITE message sent, the UE will receive a "session progress" message. In this exemplary embodiment the "session progress" message is a "183" response form the termination UE. In response to receiving the session progress message, the UE acknowledge receipt of 183 commences the reservation of the bearer for the media transport. If the UE receives 200 OK then the UE sends a re-INVITE once the reservation has been met.

The UE 102, will not include with the INVITE message, the "QoS precondition support" message when the originating network, does not support QoS precondition. The UE will know that the network does not support QoS precondition at decision 404 if the network does not respond to the SIP registration with the QoS precondition support message (i.e. a QoS precondition preference indicator message) in response to the registration of the UE 102 with the P-CSCF 122 or a message indicating that the network does not support QoS precondition, an error message or the like.

Figure 5:
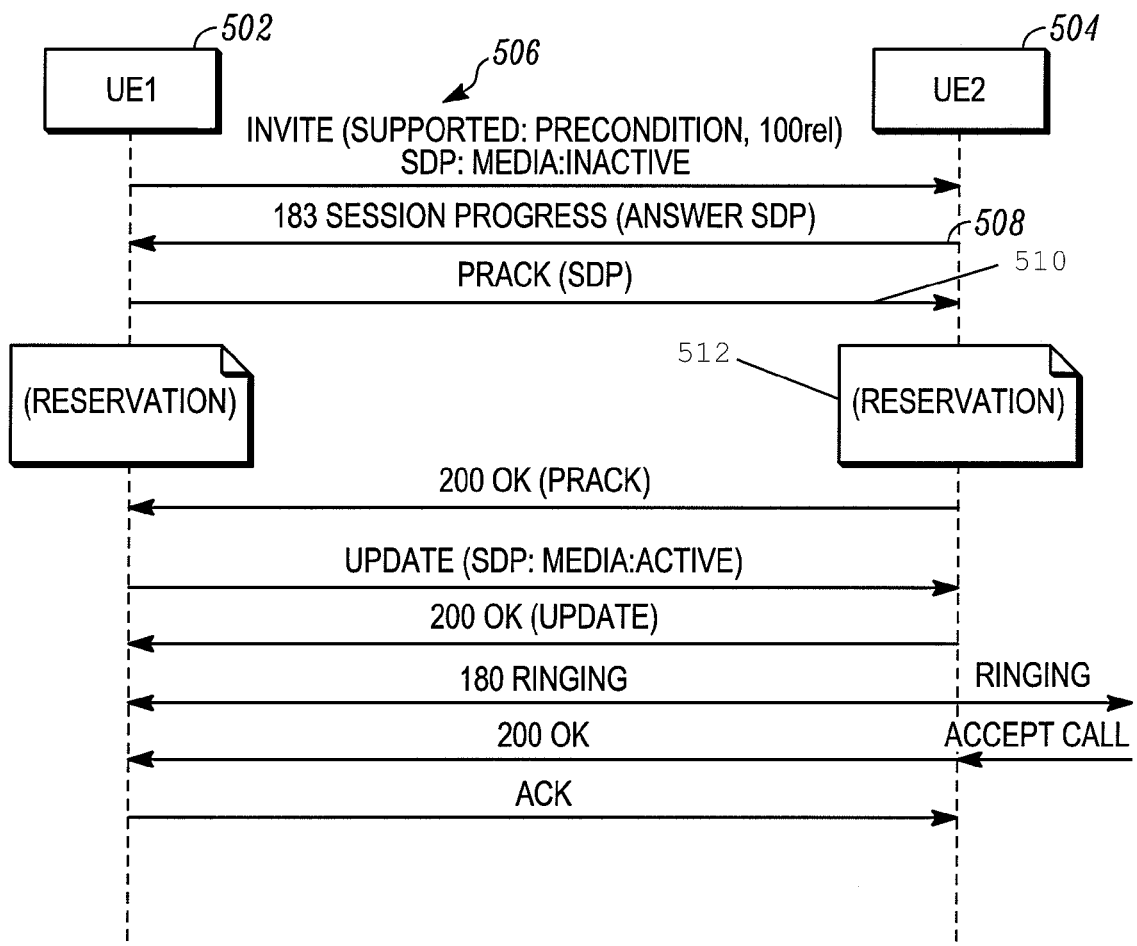
FIG. 5 shows an exemplary communications ladder diagram.

FIG. 5 illustrates the scenario wherein the network supporting the originating UE 502 supports the QoS precondition and the network associated with the terminating UE 504 supports the QoS precondition. In this scenario, the originating UE 502 sends 506 an INVITE with "supported: precondition, 100rel" message. The terminating UE 504 responds 508 with "183 session progress (answer SDP)." A provisional acknowledgement (PRACK) is sent 510 and the secondary bearer is reserved 512 for the media stream.

Figure 6:
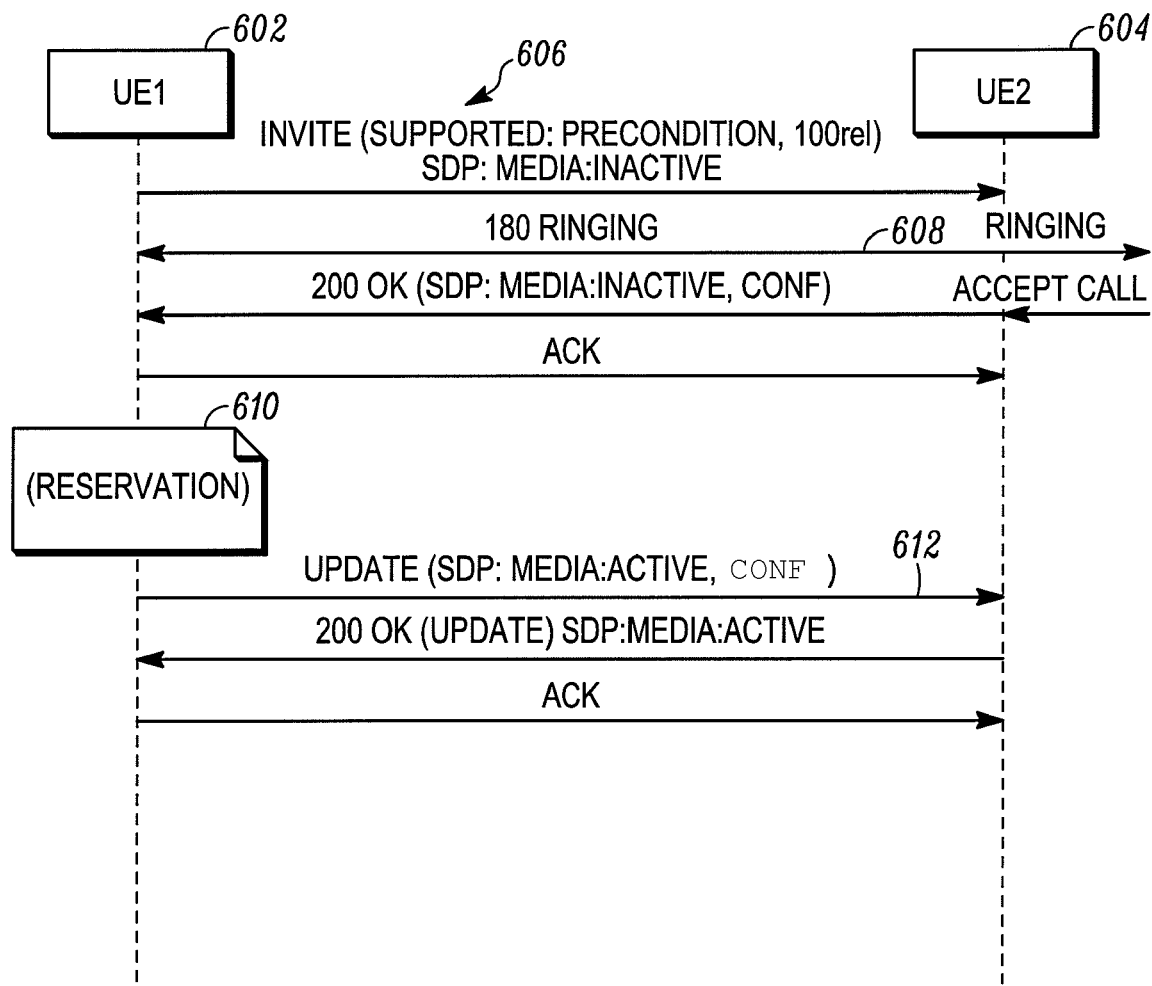
FIG. 6 shows an exemplary communications ladder diagram.

FIG. 6 illustrates the scenario wherein the network associated with the originating UE 602 supports the QoS precondition and the network associated with the terminating UE 604 does not support the QoS precondition. In this scenario, the originating UE 602 sends 606 an INVITE with "supported: precondition, 100rel" message. The terminating UE 604 responds 608 with "180 ringing" and "200 OK (SDP: media: inactive, CONF)." The originating UE then updates the INVITE by sending an "UPDATE (SDP: media:active, CONF)" after the resource reservation 610 has been completed on the originating UE network link.

Figure 7:
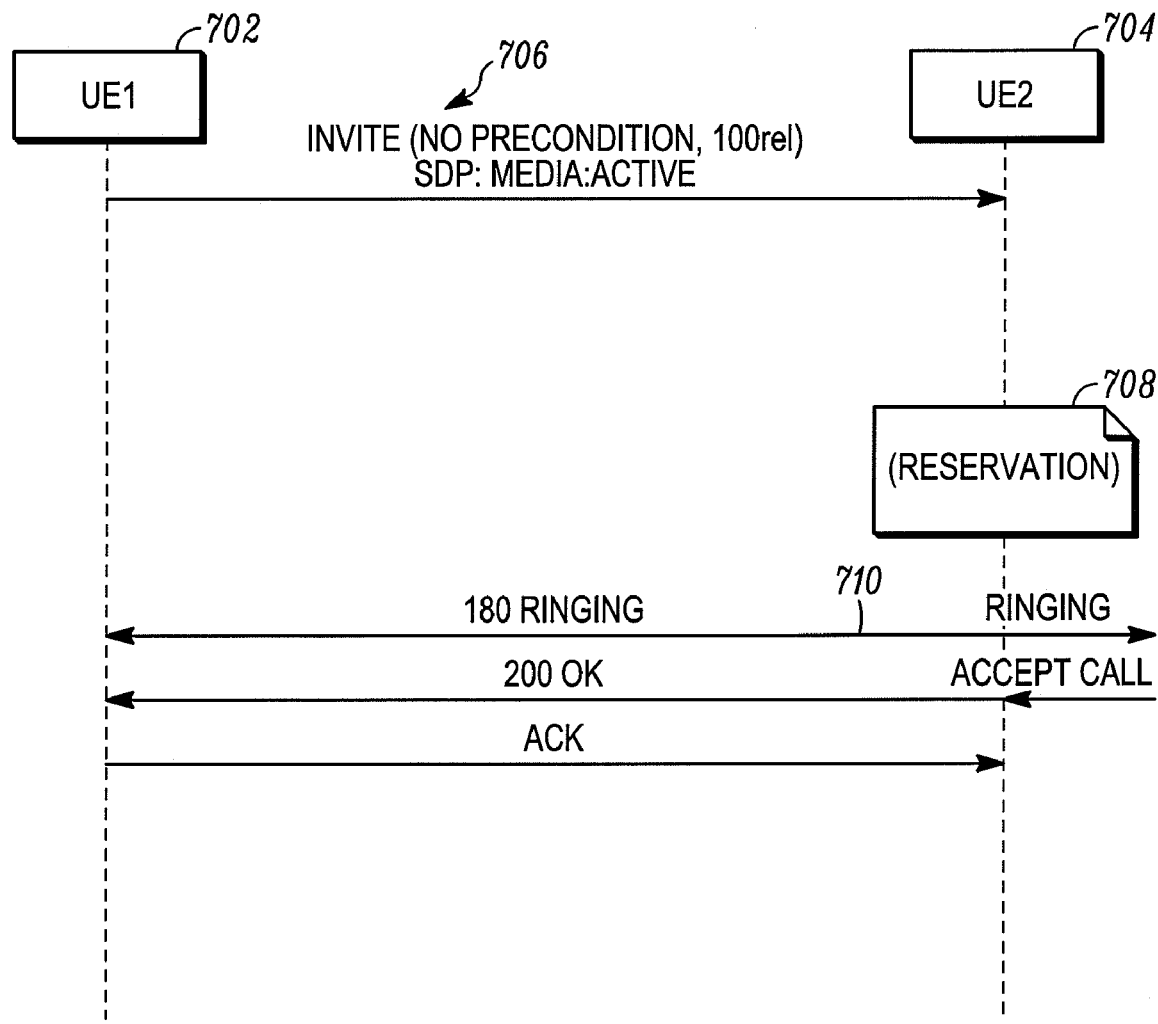
FIG. 7 shows an exemplary communications ladder diagram.

FIG. 7 illustrates the scenario wherein the originating UE is associated with a network that does not support the QoS precondition such as a WLAN (i.e. 802.11(x) or the like and the terminating UE is associated with a network that supports the QoS precondition. In this scenario, the originating UE 702 sends 706 an INVITE without a precondition supported message. The terminating UE 704 responds 710 with "180 ringing" and "200 OK" after the resource reservation 708 has been completed on the terminating UE network link.

Figure 8:
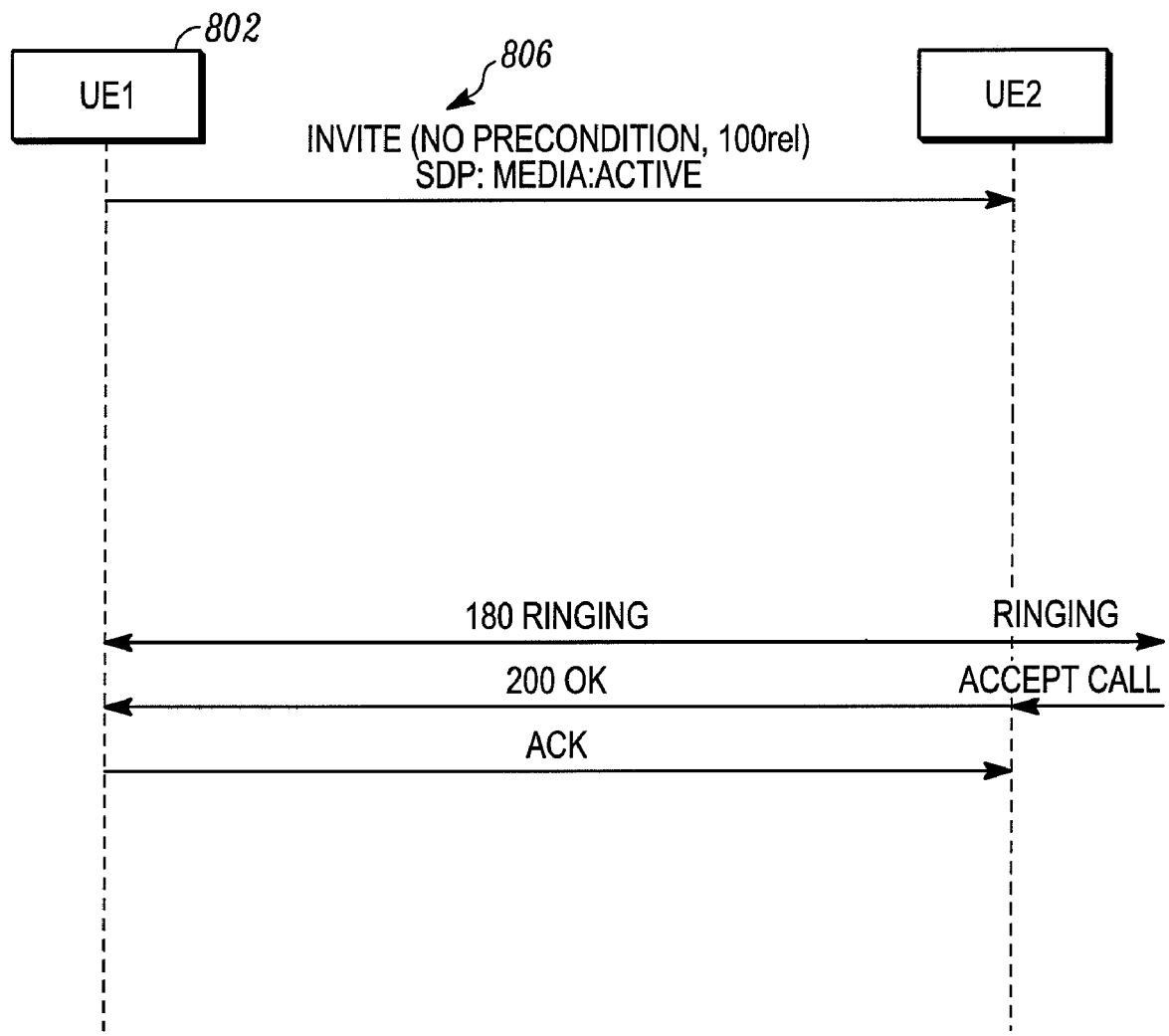
FIG. 8 shows an exemplary communications ladder diagram.

FIG. 8 illustrates the scenario wherein both networks do not support the QoS precondition. In this embodiment, the originating UE 802 again sends 806 an INVITE without a precondition supported message. No resource reservation is established.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. In a communication device, a method of establishing existence of quality of service preconditions in a communication network, the method comprising the steps of:
    sending an SIP registration request message; and
    receiving a registration acknowledgement message having a QOS precondition preference indication; and
    sending an invite that includes a quality of service precondition message that corresponds with the QoS precondition preference indication of the registration acknowledgement message.

2. The method of claim 1, comprising sending an invite that includes a quality of service precondition support message.

3. The method of claim 1, wherein the quality of service precondition message that corresponds with the QoS precondition preference indication comprises a message indicating that the communication device supports the QoS precondition preference.

4. The method of claim 1, receiving a network support for resource reservation management and QoS precondition preference in a P-Network-Access-Info header.

5. The method of claim 1, determining that the network supports the QoS precondition preference and sending the preference for supporting the QoS precondition during a SIP session.

6. The method of claim 1, determining that the network does not support the QoS precondition during registration initiating a SIP session.

7. In a communication device, a session initiation protocol method comprising the steps of:
    sending an SIP registration request message; and receiving a resource management support message and a QoS precondition preference in a response to the SIP registration request message; and populating an invite message with a message indicating that the communication device supports the QoS precondition preference.

8. The method of claim 7, further comprising sending the invite to a packet data session, wherein the message corresponding to the QoS precondition preference comprises a QoS precondition supported message when both the originating network and the terminating network support the QoS precondition.

9. A method for packet data session initiation in a communication device in communication with a network, comprising:

receiving in the communication device from the network a registration request acknowledgement that includes, a QoS precondition preference; and indicating in the communication device in an invite message during a SIP session that the QoS precondition is to be supported.

10. The method of claim 9, indicating the QoS precondition supported comprises populating the invite message with a message supported:precondition, 100rel.

* * * * *